(12) United States Patent
Ushida

(10) Patent No.: US 6,372,695 B2
(45) Date of Patent: Apr. 16, 2002

(54) BALL SCREW

(75) Inventor: Kimihito Ushida, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/838,191

(22) Filed: Apr. 20, 2001

(30) Foreign Application Priority Data

Apr. 21, 2000 (JP) .................................. 2000-121362

(51) Int. Cl.⁷ .................... C10M 169/06; F16H 25/22
(52) U.S. Cl. .................. 508/100; 508/108; 74/89.15; 74/424.8 R; 74/459; 384/13; 384/93
(58) Field of Search ........................... 508/100, 108; 384/13, 93; 74/89.15, 424.8 R, 459

(56) References Cited

U.S. PATENT DOCUMENTS

| | | | | |
|---|---|---|---|---|
| 5,749,266 A | * | 5/1998 | Tsukada | 74/459 |
| 5,906,136 A | * | 5/1999 | Yabe et al. | 74/459 |
| 6,023,991 A | * | 2/2000 | Yabe et al. | 74/459 |
| 6,178,839 B1 | * | 1/2001 | Yoshida et al. | 74/459 |

FOREIGN PATENT DOCUMENTS

| | | | |
|---|---|---|---|
| JP | 45-24562 | | 8/1970 |
| JP | 53-31646 | | 2/1997 |
| JP | 2000303089 A | * | 10/1999 |
| JP | 2000230616 A | * | 8/2000 |
| JP | 2001049274 A | * | 2/2001 |
| JP | 2001049278 A | * | 2/2001 |

* cited by examiner

Primary Examiner—Jacqueline V. Howard
(74) Attorney, Agent, or Firm—Wenderoth, Lind & Ponack, L.L.P.

(57) ABSTRACT

A ball screw is provided which makes it easy to determine the degree of deterioration of lubricating grease so that new lubricating grease can be supplied efficiently without loss. The ball screw includes a threaded shaft formed with a thread groove in its outer peripheral surface, a nut formed with a thread groove in its inner peripheral surface, and a plurality of balls rollably retained in a circulating passage comprising a helical passage formed between these thread grooves when the nut is fitted on the threaded shaft, and a passage connecting both ends of the helical passage. The balls and the circulating passage are lubricated by a lubricating grease which has a brightness of 1 or over and in which a base oil having a viscosity at 100° C. of 3.0–7.5 $mm^2/s$ is thickened by a urea-family thickener.

19 Claims, 3 Drawing Sheets

BALL SCREW

BACKGROUND OF THE INVENTION

This invention relates to a ball screw using lubricating grease and particularly to a ball screw used in a driving device for an injection molding machine or a driving device for a power press.

An ordinary ball screw is described with reference to FIG. 1. Thread grooves are formed in the outer peripheral surface of a threaded shaft 1 and the inner peripheral surface of a nut 2. They are fitted together with a plurality of balls 4 rollably held in a circulating passage comprising a helical passage 3 having both thread grooves opposed to each other, and a connecting passage connecting both ends thereof together, while lubricating the plurality of balls 4 and the circulating passage with lubricating grease so that the threaded shaft 1 and the nut 2 can move in the axial direction relative to each other while rotating about the axis.

Such a ball screw is used for a part that makes a linear movement, and serves to transmit power between the threaded shaft and the nut through the rolling and circulating balls. With such a power-transmitting ball screw, since many balls roll while also slipping, the balls and the circulating passage are subjected to stresses due to rolling friction and sliding friction simultaneously. Also, when the balls moving in the circulating passage are brought into contact with each other while turning in the same direction, since front and rear portions of the balls that are turning in directions opposite to each other are brought into contact with each other, large frictional forces are produced in such directions as to stop the rotation of the balls.

Also, with ball screws, their shape makes it difficult to accurately finish the groove shapes with required surface roughness and with the same degree of accuracy as with the inner ring and outer ring of an ordinary rolling bearing, so that the balls tend to be damaged. Thus it is considered that the durability of the balls determines the durability (or life) of the ball screw.

In order to minimize generation of a frictional force which hinders smooth movement of the balls in such a ball screw, lubricating grease is sealed around the balls and in the circulating passage of the ball screw.

Among lubricating greases used for ball screws, to a lubricating grease for a ball screw in which it is necessary to lubricate such a high-pressure frictional surface as to be used in a driving device of an injection molding machine or a driving device of a power press, an extreme-pressure agent is added. An extreme-pressure agent chemically reacts with a metallic surface which is to be a frictional surface and serves to form an extreme-pressure film that is soft and liable to be sheared and comprises an inorganic compound of iron and elements in additives, thereby preventing seizure and reducing wear.

As conventional extreme-pressure agents, sulfur compounds such as olefin sulfide, phosphorus compounds such as phosphate ester, compounds containing sulfur, phosphorus and zinc such as dialkyldithiophosphate salts and dialkyldithiocarbamate salts, molybdenum disulfide and graphite are known.

But even if a grease that is superior in wear resistance is sealed, if high loads are repeatedly applied to a ball screw, if it is used in a high-temperature atmosphere, or if it is used in an environment in which foreign matter tends to mix into the grease, the grease tends to deteriorate.

If the grease in the ball screw deteriorates, smooth rotation of the balls is impaired, so that an abnormal noise is produced or damage occurs in the balls or the circulating passage.

In order to cure such deterioration of lubricating grease, ordinarily, lubricating grease is additionally supplied to a ball screw at suitable time intervals by providing a grease-feed unit (hereinafter referred to as grease feeding)

But determining a suitable grease-feed timing or precisely determining the amount of lubricating grease to be added requires much experience. Thus it was a technique that required skill.

In particular, with ball screws used in driving portions for power injection molding machines and power presses, in which screws are driven by electric servo motors, instead of conventional hydraulic cylinders, the deteriorating speed of the grease varies according to the molding pattern. For example, the action of a cylinder for injection molding shows specific driving patterns corresponding to molded articles. Thus it is necessary to determine suitable grease-feed intervals for ball screws according to such driving patterns and adjust the grease-feed amount.

But for such adjustment of grease-feed conditions according to the use conditions of machines, many year's experience were needed, and it was not an easy thing for a less experienced person to carry out grease feeding of a precise amount and with precise timing.

An object of the present invention is to provide a ball screw which makes it easy to precisely determine the timing of grease feeding and to correctly adjust the amount to be added.

In particular, an object of the present invention is to provide, as a ball screw for a driving portion applicable to power injection molding machines and power presses, one which makes it easy to precisely determine the timing of grease feeding and which makes the determination for correctly adjusting the added amount as easy as possible.

SUMMARY OF THE INVENTION

According to this invention, there is provided a ball screw comprising a threaded shaft formed with a thread groove in an outer peripheral surface thereof, a nut mounted on the threaded shaft and formed with a thread groove in an inner peripheral surface thereof, and a plurality of balls rollably retained in a circulating passage comprising a helical passage formed between the thread groove formed in the threaded shaft and the thread groove formed in the nut and a connecting passage connecting both ends of the helical passage, the balls and the circulating passage being lubricated by a lubricating grease, characterized in that the lubricating grease has a brightness of 1 or over.

Since such a ball screw is filled with a lubricating grease having a brightness of 1 or over, when the lubricating grease deteriorates due to mixing of worn powder after use for a prolonged time, it changes color to black and its brightness drops to less than 1, so that it is possible to easily determine the grease feed timing.

With such a ball screw, it is preferable to feed new grease upon start of change of color. By continuing such a grease feed twice or three times, it is possible to precisely determine suitable grease-feed amount and intervals.

Also for such a ball screw, it is preferable to use a lubricating grease in which a base oil having a viscosity at 100° C. of 3.0–7.5 $mm^2/s$ is thickened by a urea-family thickener.

This is because by lowering the viscosity of the base oil so as to reach the above predetermined viscosity, lubricating grease supplied onto the frictional surface will be supplied smoothly, so that the durability of the ball screw improves.

Also, if the viscosity at 100° C. is less than 3.0, lubricating grease would be supplied excessively in a short time, which is not preferable. Also, since the flash point of the grease drops, heating and mixing during manufacture of grease become difficult.

Also, since grease thickened with a urea-family thickener has a good heat resistance, it is suitable as a ball screw used in a driving device for e.g. a power injection molding machine or in a driving device of a power press.

Also, a ball screw using a lubricating grease which contains 0.1–10 wt % of an extreme-pressure agent comprising an organic molybdenum compound but no other black-family extreme-pressure agent can be used as it is if the brightness is 1 or over. Otherwise, since it is reliably colored to a brightness of 1 or over by blending a colorant other than black, it is possible to reliably detect a state in which its color has changed black and the brightness has dropped below 1 due to deterioration of the grease. Thus it is possible to accurately determine the grease-feed time.

Other features and objects of the present invention will become apparent from the following description made with reference to the accompanying drawings, in which:

DETAILED DESCRIPTION OF THE PREFERRED EMBODIMENTS

With reference to the attached drawings, the embodiments of this invention are described below.

Figure 1:
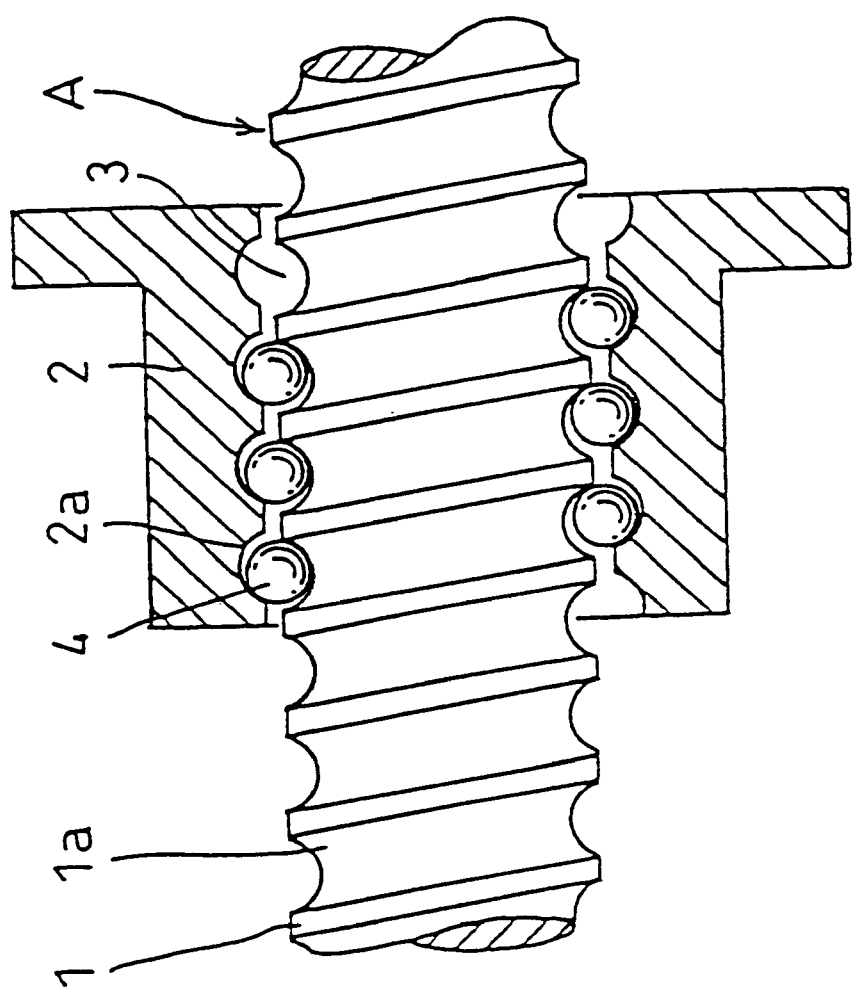
FIG. 1 is a sectional view of a first embodiment.

As shown in FIG. 1, with the ball screw A of the first embodiment, thread grooves $1a$ and $2a$ are formed in the outer peripheral surface of a threaded shaft 1 and the inner peripheral surface of a nut 2, respectively. A plurality of balls 4 are rollably retained in a circulating passage comprising a helical passage 3 formed when the threaded grooves are opposed to each other, and a connecting passage connecting both ends of the helical passage 3 together (it is ordinarily formed inside the nut 2 or along the outer surface of the nut; not shown) to rotatably retain the nut 2 and the threaded shaft 1 through the balls 4 in the helical passage 3, and the plurality of balls 4 and their circulating passage are lubricated with a lubricating grease (not shown).

The lubricating grease sealed inside the ball screw is one in which the base oil and the thickener are selected, colored or both so that the brightness is 1 or over, preferably 2 or over. Here, it is a lubricating grease in which a base oil having a viscosity at 100° C. of 3.0–7.5 mm$^2$/s is thickened with a urea-family thickener, and an extreme-pressure agent comprising an organic molybdenum compound is blended by 0.1–10 wt %.

If the content of the extreme-pressure agent is less than 0.1 wt %, it is impossible to sufficiently reduce the slip friction between balls, and thus it becomes difficult to smoothen the rolling of the balls if the ball screw is driven under high loads. Also, even if it is blended in a larger amount than 10 wt %, the effect would not increase any further with higher cost. In view of such a tendency, a more preferable content is in the range of 3–5 wt %.

The lubricating grease contains a base oil and a thickener. As the base oil, a mineral oil, ester-type synthetic oil, ether-type synthetic oil, hydrocarbon-type synthetic oil, etc. may be used.

Because a urea-family thickener which is added to the lubricating grease has a good high-temperature stability, it is a preferable thickening component for a lubricating grease for a ball screw used under high loads.

In this invention, among urea-family thickeners, by using a diurea-family thickener, favorable results have been obtained. Such a diurea-family thickener is shown by the following chemical formula:

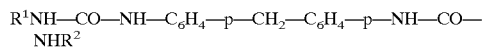

(wherein $R^1$ and $R^2$ are aryl groups or cyclohexyl groups having a carbon number of 6–7. They may be identical to or different from each other.)

Such diurea-family thickeners may be ones obtained by reacting such a monoamine as aniline, p-toluidine and cyclohexylamine with diphenylmethane-4,4'-diisocyanate.

The lubricating grease having a brightness of 1 or over, referred to in this invention, is one in which the colors of the initially sealed grease and the replenished grease have been adjusted to bright colors other than black so that the degree of deterioration can be visually determined. Specifically, it is prepared by selecting the kinds of the base oil and the thickener, or by coloring them, or by both.

Here, the brightness is the brightness of color normally evaluated in ten stages with an ideal black in the Munsell system as 0 and an ideal white as 10. That is to say, being 1 or over in brightness indicates any arbitrary color brighter than the ideal black, e.g. gray, yellow, blue, light blue, green, purple, orange, red, white, etc.

As a colorant mixed into the grease, any one selected from a well-known inorganic pigment, organic pigment or a dye may be used. As inorganic pigments, ultramarine, cadmium yellow, red iron oxide, chrome yellow, lead white, titanium white, etc. can be cited. Also, as organic pigments or dyes, azo-family, triphenylmethane-family, quinoline-family, anthraquinone-family, phthalocyanine-family, etc. can be cited.

As organic molybdenum compounds used in this invention, molybdenum sulfurized dialkyl dithiocarbamate, molybdenum sulfurized dialkyl dithiophosphate or an organic molybdenum compound using both of them can be cited.

As a molybdenum sulfurized dialkyl dithiocarbamate, one expressed by the following formula is especially preferable.

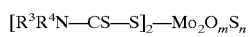

(wherein $R^3$ and $R^4$ indicate alkyl groups having a carbon number of 1–24, m+n=4, and m is 0–3 and n is 4–1.)

The above compound is well-known as a solid lubricant, and for example, one in which m=2.35–3 and n=1.65–1 is described in Japanese patent publication 45-24562, and one in which m=0.5–2.3 and n=3.5–1.7 is described in Japanese patent publication 53-31646.

The molybdenum sulfurized dialkyl dithiocarbamate is one expressed by the following formula:

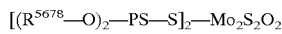

(wherein $R^5$, $R^6$, $R^7$ and $R^8$ are independent of one another, and indicate monohydric or dihydric alkyl groups having a carbon number of 1–24, preferably 3–20, or aryl groups having a carbon number of 6–30, preferably 8–18.)

The extreme-pressure agent comprising a zinc thiophosphate compound is an organic metal-family extreme-pressure agent containing sulfur, phosphorus and zinc, and is zinc dialkyldithiophosphate or zinc diallyldithiophosphate (ZnDPT).

As a preferable example of the zinc dithiophosphate compounds, one expressed by the following formula can be cited.

(wherein $R^6$ is a alkyl group having a carbon number of 1–24 or an aryl group having a carbon number of 6–30. One in which R6 is monohydric or dihydric alkyl group having a carbon number of 3–8 is most preferable.)

Such a zinc dithiophosphate performs a wear-preventive function, after adsorbing to the surface of a metal (iron), by producing an olefin from the alkyl groups by heat decomposition, and producing hydrogen sulfide, mercaptan or alkylsulfide, and then forming an extreme-pressure film comprising an inorganic polymer containing sulfur, phosphorus and zinc.

The content of an extreme-pressure agent comprising zinc dithiophosphate compound added to the lubricating grease is preferably 0.1–15 wt %. If less than 0.1 wt %, the effect would not reveal, and if over 15 wt %, its effect would not increase any further with higher cost. Due to such a tendency, a more preferable content is 5–6 wt %.

Using a zinc dithiophosphate compound with an aliphatic amide is also preferable. As aliphatic amides, palmitic acid amide and stearic acid amide expressed by the following formula can be cited.

(wherein $R^7$ indicates an alkyl group having a carbon number of 16–17.)

Figure 2:
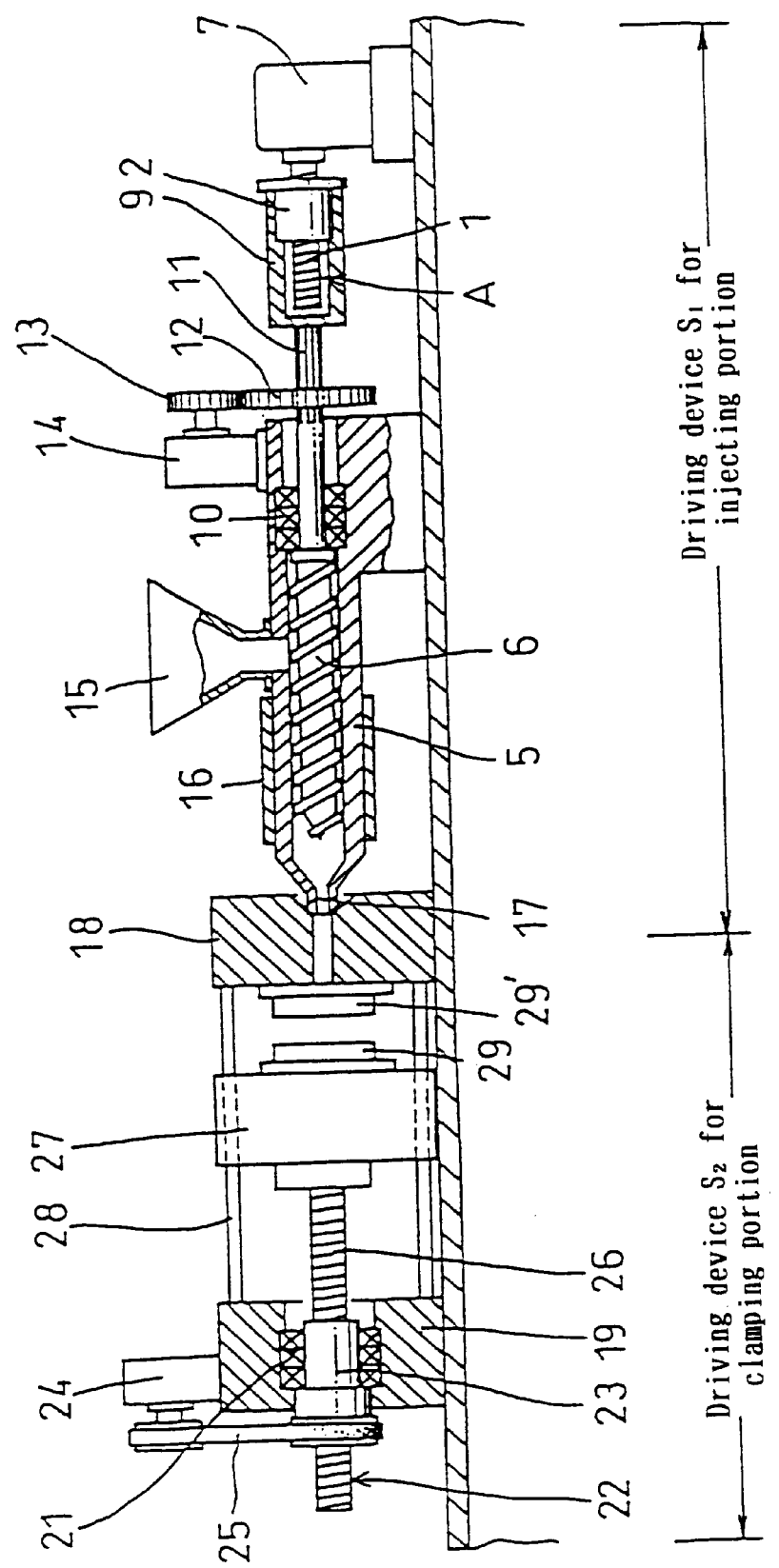
FIG. 2 is a partially sectional front view showing a second embodiment.

Next, as shown in FIG. 2, the ball screw A used in a driving device for a power injection molding machine of a second embodiment has the same structure as the first embodiment, and is mounted in an injecting portion driving device S1 in an inline screw type lateral injection molding machine.

The injecting portion driving device S1 is designed to move an extruding screw 6 inserted in a heating cylinder 5 back and forth in its axial direction. It has a driving source 7 comprising a speed reducer and a motor. The threaded shaft 1 of the ball screw A is coupled to its driving shaft. The nut 2 fitted on the threaded shaft 1 is integral with the inner surface of a cylindrical coupling member 9. The latter has one end thereof coupled to the rear end of the extruding screw 6. The extruding screw 6 and the threaded shaft 1 are arranged concentrically.

The extruding screw 6 is supported in the heating cylinder 5 by bearings 10 so as to be rotatable and movable back and forth. To the rear end, which is exposed to the outside of the heating cylinder 5, serrations 11 are formed. A gear 12 meshes with the serrations 11. Further, through a gear 13 meshing with the gear 12, it is coupled to a driving source 14 of the extruding screw 6. At the upper portion of the heating cylinder 5, a hopper 15 for supplying material is provided, and a heater 16 is mounted on the outer peripheral surface of the heating cylinder 5.

Resin material in the hopper 15 is fed forward by rotating the extruding screw 6 by the driving source 14 and heated and melted by the heater 16. When the threaded shaft 1 of the ball screw A is turned by actuating the driving source 7 of the injecting portion driving device S1, the nut 2 and the coupling member 9 integral therewith advance to advance the extruding screw 6 coupled to the coupling member 9 to inject the molten resin in the heating cylinder 5 into a fixed platen 18 through a nozzle 17 at the tip. Upon completion of injection of resin, the extruding screw 6 is rotated by the driving source 7 in the resin material feed-out direction to feed out the resin material. As the coupling member 9 and the nut 2 rotate, the extruding screw 6 is retracted to prepare for the next extrusion.

On the other hand, the clamping portion driving device S2 is a kind of power press in which a nut 23 of a ball screw 22 is rollably supported in a fixed table 19 through bearings 21 and the driving force of a driving source 24 comprising a motor and a speed reducer is transmitted to the nut 23 by a belt 25. The ball screw A of the injecting portion driving device S1 and the ball screw 22 of the clamping portion driving device S2 have similar structures. A threaded shaft 26 is fitted in the nut 23, and a movable platen 27 is coupled to the tip of the threaded shaft 26.

The movable platen 27 is slidably supported by guide bars 28 provided between the fixed platen 18 and the fixed table 19, and adapted to move toward and away from the fixed platen 18. Molds 29 and 29' are mounted on opposing surfaces of the fixed platen 18 and the movable platen 27. Also, on the movable platen 27, ejecting pins (not shown) for pushing out molded products are provided so as to protrude and retract.

The clamping portion driving device S2 performs clamping (or pressing) of the molds 29, 29' by rotating the nut 23 by means of the driving source 24 and advancing the movable platen 27 together with the threaded shaft 26. Also, the movable platen 27 is retracted by turning the nut 23 in reverse to eject molded products by opening the molds 29, 29'.

Figure 3:
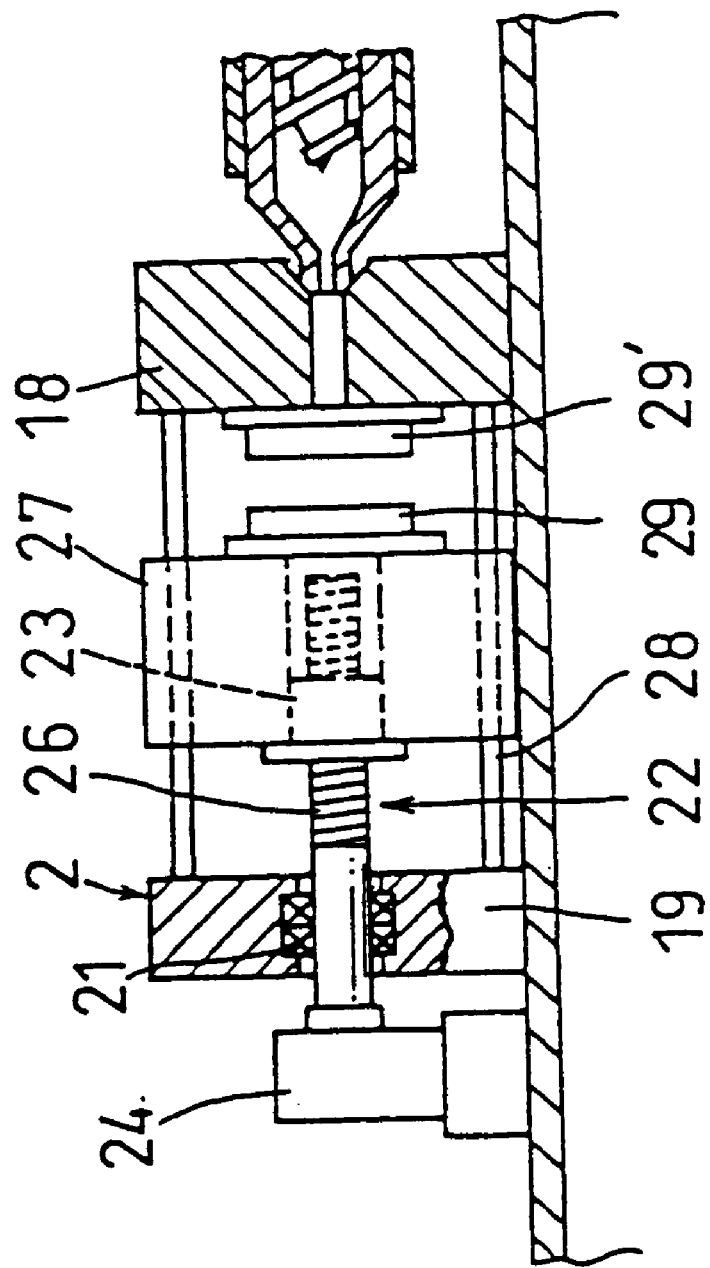
FIG. 3 is a partially sectional front view showing a portion of a third embodiment.

Next, according to a third embodiment shown in FIG. 3, in the clamping portion driving device S2, the nut 23 of the ball screw 22 is fixed to the movable platen 27, and the threaded shaft 26 fitted in the nut 23 is rotatably supported by the bearings 21 of the fixed table 19. The driving source 24 is coupled to the threaded shaft 26. When the threaded shaft 26 is rotated by the driving source 24, the movable platen 27 integral with the nut 23 moves back and forth to perform clamping and opening of the molds 29, 29'. Other structures are the same as in the second embodiment.

EXAMPLE 1

4100 grams of a mineral oil (having the viscosity shown in Table 1) as a base oil and 1012 grams of diphenylmethane-4,4'-diisocyanate were put in a container, and the mixture was heated to 70–80° C. Also, 4100 grams of a base oil (mineral oil), 563 grams of cyclohexylamine and 225 grams of aniline were put in another container, and after heated to 70–80° C., the mixture was added to the first container. Then, the mixture was heated to 160° C. while agitating it well, and then it was let to cool to manufacture a base grease.

To 94 wt % of this base grease, the following additives (a) and (b) were blended so that the brightness would be 4, and at the same time they were mixed in a three-stage roll mill while suitably adding a base oil.
(a) molybdenum sulfurized dialkyl dithiocarbamate (Molyvan made by R.T. Vanderbilt): 2.0 wt %
(b) molybdenum dithiophosphate (Irgalube 211 made by CIBA-GEIGY): 2.0 wt %

EXAMPLE 2

To 94 wt % of a base grease manufactured in exactly the same manner as in Example 1, the above additives (a) and (b), 1.0 wt % of zinc dithiophosphate, and titanium white were blended, and they were mixed in a three-stage roll mill while suitably adding a base oil to obtain a grease having a brightness of 7.

COMPARATIVE EXAMPLES 1–5

The following commercially available greases were used. For the greases of Comparative Examples 2 and 3, Molycoate Micro Powder made by Dow Corning, which were molybdenum compounds were blended by 0.5 wt % and 4.0 wt %, respectively.
(a) Comparative Examples 1–3 (LUBER NS NO. 2 made by Lube, worked penetration: 283 at 25° C., dropping point: 194, dynamic viscosity of base oil at 40° C.: 127.9, at 100° C.: 13.80, base oil viscosity index: 102)
(b) Comparative Example 4 (Palmax made by Kyodo Yushi Co.,Ltd. dynamic viscosity of base oil at 100° C.: 17.2, worked penetration: 300, dropping point: 215° C.)
(c) Comparative Example 5 (Molywhite made by Kyodo Yushi Co.,Ltd., dynamic viscosity of base oil at 100° C.: 28.2, worked penetration: 325, dropping point: 180° C.)

COMPARATIVE EXAMPLES 6–8

Except that a mineral oil (having the viscosity shown in Table 1) was used as the base oil, a base grease was manufactured in exactly the same manner as in Example 1.

To 94 wt % of this base oil, the above additives (a) and (b) were added at the rates shown in Table 1, and they were mixed in a three-stage roll mill while adding a base oil without adding a colorant.

The lubricating greases of Examples 1 and 2 and Comparative Examples 1–8 thus obtained were sealed in a ball screw for an injecting portion driving device of an injection molding machine of the structure shown in FIG. 2, and an endurance test for examining the durability (or roundness of the balls) was conducted as follows.

The load conditions for the ball screw in this test were a maximum load of 30 tons (×1000 kgf), and after load cycles in which a cycle of no load—30—ton load—no load was repeated 200 thousand times, the roundness of the balls was examined and the change in color of the lubricating grease before and after the test was checked by the naked eye.

As is apparent from the results shown in Table 1, the ball screws of Comparative Examples 1–8, in which no extreme-pressure agent was added to an organic molybdenum compound, showed wear damage in which the ball roundness was 1.62–8.62 $\mu$m. And for the lubricating grease, the brightness dropped due to wear powder to near 1. But since no color adjustment was made at the beginning of the test, it was impossible to distinguish the change of brightness.

Also, for Comparative Example 5, in which adhesion was improved by blending a polymer into a base oil, the effect of reduction of the ball wear was slightly recognized, but did not reach the expected degree.

In contrast, for the ball screws of Examples 1 and 2, in which organic molybdenum compounds were added and color adjustment was made to a predetermined brightness, wear damage was very little as will be seen from the fact that the ball roundness after the endurance test was 0.26–0.32 $\mu$m.

When the endurance test was continued in which the load-no-load cycle was repeated 300 thousand times or over, the lubricating grease changed color to nearly black and its brightness dropped below 1. Thus it was found out that the grease-feed time had come.

For Examples of the ball screws in which was sealed a lubricating grease which was high in wear damage prevention, it was confirmed that it was clearly easy to judge the degree of deterioration of the lubricating grease, so that it is possible to supply fresh lubricating grease efficiently without loss into the ball screw.

As described above, since the ball screw of this invention uses a lubricating grease having a brightness of 1 or over, when the lubricating grease deteriorates due to use of the ball screw in various conditions, it turns black and its brightness drops to less than 1, so that it is easy to determine the degree of deterioration of the lubricating grease. Thus it is possible to supply new lubricating grease efficiently without loss.

Also, since it is possible to precisely determine the grease-feed time for a ball screw in which the deteriorating speed of the lubricating grease varies according to use conditions, a ball screw applicable particularly to a driving unit of a power injection molding machine and a power press is provided.

TABLE 1

| | | Number | | | | | | | | |
|---|---|---|---|---|---|---|---|---|---|---|
| | | Example | | Comparative Example | | | | | | |
| Component & test | | 1 | 2 | 1 | 2 | 3 | 4 | 5 | 6 | 7 | 8 |
| Component | | | | | | | | | | | |
| base oil | | | | | | | | | | | |
| mineral oil | | ○ | ○ | ○ | ○ | ○ | ○ | ○ | ○ | ○ | ○ |
| viscosity (mm$^2$/s) | | 5 | 5 | 13.8 | 13.8 | 13.8 | 17.2 | 28.2 | 13.2 | 5 | 5 |
| thickener (lithium soap) | | | | ○ | ○ | ○ | | ○ | | | |
| thickener (composite lithium) | | | | | | | ○ | | | | |
| thickener (urea) | | ○ | ○ | | | | | | ○ | ○ | ○ |
| Additive (wt %) | | | | | | | | | | | |
| polymer | | | | | | | | ○ | | | |
| organic Mo | | | | | | | | | | | |
| MoDTC | | 2.0 | 2.0 | — | 0.5 | 4.0 | — | — | 4.0 | 4.0 | — |
| MoDTP | | 2.0 | 2.0 | — | — | — | — | — | — | — | 4.0 |
| Zinc dithiophosphate | | — | 1.0 | — | — | — | — | — | — | — | — |
| ball roundness | | 0.32 | 0.26 | 8.62 | 4.55 | 4.52 | 6.20 | 2.17 | 2.83 | 1.85 | 1.62 |

We claim:

1. A ball screw comprising a threaded shaft formed with a thread groove in outer peripheral surface thereof, a nut mounted on said threaded shaft and formed with a thread groove in inner peripheral surface thereof, and a plurality of balls rollably retained in a circulating passage comprising a helical passage formed between said thread groove formed in said threaded shaft and said thread groove formed in said nut and a connecting passage connecting both ends of said helical passage, said balls and said circulating passage being lubricated by a lubricating grease, characterized in that said lubricating grease has a brightness of 1 or over.

2. The ball screw as claimed in claim 1 wherein said lubricating grease comprises a base oil having a viscosity at 100° C. of 3.0–7.5 mm$^2$/s and a urea-family thickener.

3. The ball screw as claimed in claim 1 wherein said lubricating grease further contains 0.1–10 wt % of an extreme-pressure agent comprising an organic molybdenum compound.

4. The ball screw as claimed in claim 3 wherein said organic molybdenum compound is at least one of molybdenum sulfurized dialkyl dithiocarbamate, and molybdenum sulfurized dialkyl dithiophosphate.

5. The ball screw as claimed in claim 1 wherein said lubricating grease further contains 0.1–15 wt % of an extreme-pressure agent comprising a zinc dithiophosphate compound.

6. The ball screw as claimed in claim 1 wherein said ball screw is used in a driving device for a power injection molding machine.

7. The ball screw as claimed in claim 1 wherein said ball screw is used in a driving device for a power press.

8. The ball screw as claimed in claim 2 wherein said lubricating grease further contains 0.1–10 wt % of an extreme-pressure agent comprising an organic molybdenum compound.

9. The ball screw as claimed in claim 2 wherein said lubricating grease further contains 0.1–15 wt % of an extreme-pressure agent comprising a zinc dithiophosphate compound.

10. The ball screw as claimed in claim 3 wherein said lubricating grease further contains 0.1–15 wt % of an extreme-pressure agent comprising a zinc dithiophosphate compound.

11. The ball screw as claimed in claim 4 wherein said lubricating grease further contains 0.1–15 wt % of an extreme-pressure agent comprising a zinc dithiophosphate compound.

12. The ball screw as claimed in claim 2 wherein said ball screw is used in a driving device for a power injection molding machine.

13. The ball screw as claimed in claim 3 wherein said ball screw is used in a driving device for a power injection molding machine.

14. The ball screw as claimed in claim 4 wherein said ball screw is used in a driving device for a power injection molding machine.

15. The ball screw as claimed in claim 5 wherein said ball screw is used in a driving device for a power injection molding machine.

16. The ball screw as claimed in claim 2 wherein said ball screw is used in a driving device for a power press.

17. The ball screw as claimed in claim 3 wherein said ball screw is used in a driving device for a power press.

18. The ball screw as claimed in claim 4 wherein said ball screw is used in a driving device for a power press.

19. The ball screw as claimed in claim 5 wherein said ball screw is used in a driving device for a power press.

* * * * *